(12) United States Patent
Tatourian et al.

(10) Patent No.: US 9,889,859 B2
(45) Date of Patent: Feb. 13, 2018

(54) DYNAMIC SENSOR RANGE IN ADVANCED DRIVER ASSISTANCE SYSTEMS

(71) Applicant: Intel Corporation, Santa Clara, CA (US)

(72) Inventors: Igor Tatourian, Santa Clara, CA (US); Rita H Wouhaybi, Portland, OR (US); Peter C. Brink, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 14/976,665

(22) Filed: Dec. 21, 2015

(65) Prior Publication Data

US 2017/0174227 A1 Jun. 22, 2017

(51) Int. Cl.

| | |
|---|---|
| *B60W 50/04* | (2006.01) |
| *G05D 1/00* | (2006.01) |
| *B60R 1/00* | (2006.01) |
| *B60W 50/14* | (2012.01) |
| *G06K 9/00* | (2006.01) |
| *G06K 9/20* | (2006.01) |
| *G06K 9/32* | (2006.01) |

(52) U.S. Cl.
CPC .............. *B60W 50/045* (2013.01); *B60R 1/00* (2013.01); *B60W 50/14* (2013.01); *G05D 1/0088* (2013.01); *G06K 9/00805* (2013.01); *G06K 9/209* (2013.01); *G06K 9/3241* (2013.01); *B60R 2300/205* (2013.01); *B60W 2050/046* (2013.01); *B60W 2420/40* (2013.01); *B60W 2420/42* (2013.01); *B60W 2420/52* (2013.01); *B60W 2420/54* (2013.01); *B60W 2520/10* (2013.01); *B60W 2600/00* (2013.01); *B60W 2710/30* (2013.01)

(58) Field of Classification Search
None
See application file for complete search history.

(56) References Cited

U.S. PATENT DOCUMENTS

| | | | | | |
|---|---|---|---|---|---|
| 6,032,098 | A | * | 2/2000 | Takahashi | G01C 21/28 701/23 |
| 6,463,369 | B2 | * | 10/2002 | Sadano | B62D 1/28 180/167 |
| 7,782,179 | B2 | * | 8/2010 | MacHii | G01S 11/12 340/435 |
| 8,164,627 | B1 | * | 4/2012 | Hahn | B60R 1/00 348/148 |

(Continued)

FOREIGN PATENT DOCUMENTS

EP  2530651  12/2012

OTHER PUBLICATIONS

"International Application Serial No. PCT/US2016/063018, International Search Report dated Mar. 8, 2017", 3 pgs.

(Continued)

*Primary Examiner* — Jonathan M Dager
(74) *Attorney, Agent, or Firm* — Schwegman Lundberg & Woessner, P.A.

(57) ABSTRACT

Various systems and methods for implementing dynamic sensor range in advanced driver assistance systems are described herein. A system for managing an autonomous vehicle comprises a vehicle control system in a vehicle to detect a speed of the vehicle and adjust a forward-facing camera array based on the speed of the vehicle.

20 Claims, 4 Drawing Sheets

(56) References Cited

U.S. PATENT DOCUMENTS

| | | | | |
|---|---|---|---|---|
| 9,092,677 | B2* | 7/2015 | Min | G06K 9/00818 |
| 9,308,917 | B2* | 4/2016 | Oh | B60W 30/16 |
| 9,443,313 | B2* | 9/2016 | Muramatsu | G01C 3/06 |
| 9,592,764 | B2* | 3/2017 | Randler | G06K 9/00805 |
| 9,665,100 | B2* | 5/2017 | Shashua | G05D 1/0221 |
| 2002/0140562 | A1* | 10/2002 | Gutta | G08B 21/06 |
| | | | | 340/576 |
| 2005/0125154 | A1* | 6/2005 | Kawasaki | G01D 1/16 |
| | | | | 701/301 |
| 2005/0206510 | A1* | 9/2005 | Weber | B60R 1/00 |
| | | | | 340/435 |
| 2008/0040004 | A1* | 2/2008 | Breed | B60R 21/0134 |
| | | | | 701/45 |
| 2009/0010494 | A1* | 1/2009 | Bechtel | B60Q 1/1423 |
| | | | | 382/104 |
| 2009/0153664 | A1* | 6/2009 | Higuchi | G06K 9/00805 |
| | | | | 348/148 |
| 2010/0232712 | A1* | 9/2010 | Tomita | G06K 9/00228 |
| | | | | 382/209 |
| 2013/0073194 | A1* | 3/2013 | Nakamura | G06K 9/00805 |
| | | | | 701/301 |
| 2013/0103298 | A1* | 4/2013 | Becker | G01S 13/86 |
| | | | | 701/300 |
| 2014/0055602 | A1* | 2/2014 | Childs | G01C 21/00 |
| | | | | 348/118 |
| 2014/0214271 | A1* | 7/2014 | Choi | B60R 1/002 |
| | | | | 701/36 |
| 2015/0146189 | A1* | 5/2015 | Kim | G01S 17/936 |
| | | | | 356/4.01 |
| 2015/0232030 | A1* | 8/2015 | Bongwald | B60R 1/00 |
| | | | | 348/115 |
| 2016/0165211 | A1* | 6/2016 | Balasubramanian | H04N 13/0242 |
| | | | | 348/38 |
| 2016/0280133 | A1* | 9/2016 | Salomonsson | B60Q 9/008 |
| 2017/0008521 | A1* | 1/2017 | Braunstein | G01C 21/32 |
| 2017/0043768 | A1* | 2/2017 | Prokhorov | B60W 30/0953 |
| 2017/0174227 | A1* | 6/2017 | Tatourian | B60W 50/045 |
| 2017/0206427 | A1* | 7/2017 | Ginsberg | G06K 9/00825 |

OTHER PUBLICATIONS

"International Application Serial No. PCT/US2016/063018, Written Opinion dated Mar. 8, 2017", 6 pgs.

* cited by examiner

DYNAMIC SENSOR RANGE IN ADVANCED DRIVER ASSISTANCE SYSTEMS

TECHNICAL FIELD

Embodiments described herein generally relate to vehicle controls and in particular, to using dynamic sensor range in advanced driver assistance systems.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein implement dynamic sensor ranges in advanced driver assistance systems (ADAS). ADAS includes various forward, sideward, and rearward facing sensors in a vehicle. The sensors include radar, LIDAR, cameras, ultrasound, infrared, and other sensor systems. Front-facing sensors may be used for adaptive cruise control, parking assistance, lane departure, collision avoidance, pedestrian detection, and the like. Many of these types of systems implement difficult image analysis or other types of analysis that requires intense computing power. Conventional systems are able to process data out to a distance of about 200 meters ahead of the vehicle. As the vehicle increases forward speed, the amount of time to process such data is reduced until at some point the systems are unable to process the data before the vehicle needs to react to it. In effect, the vehicle is outrunning the processing range of the sensor systems. What is needed is a mechanism to augment the processing efficiency of ADAS and related systems to provide sufficient reaction time for the driver and the vehicle.

Figure 1:
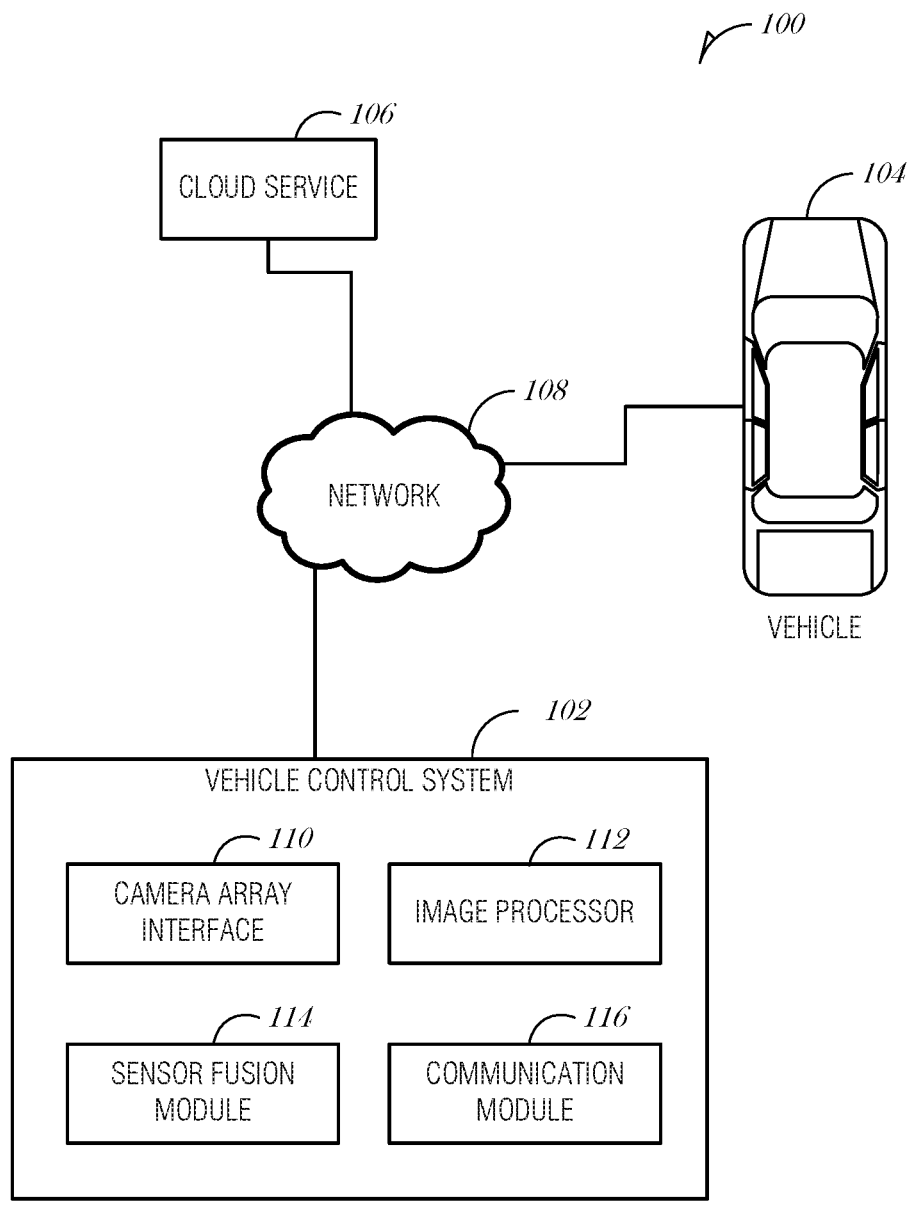
FIG. 1 is a schematic drawing illustrating a system to control a vehicle, according to an embodiment.

FIG. 1 is a schematic drawing illustrating a system 100 to control a vehicle, according to an embodiment. FIG. 1 includes a vehicle control system 102, a vehicle 104, and a cloud service 106, communicatively coupled via a network 108.

The vehicle 104 may be of any type of vehicle, such as a commercial vehicle, a consumer vehicle, a recreation vehicle, a car, a truck, a motorcycle, or a boat, able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle. Cameras in the sensor array may include infrared or visible light cameras, able to focus at long-range or short-range with narrow or large fields of view.

The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

The cloud service 106 may be provided as software as a service, a central computing platform, a virtualized computing platform, or the like. The could service 106 may collect data from the vehicle 104, the vehicle control system 102, or occupants of the vehicle 104, to provide services to the vehicle 104, the occupants of the vehicle 104, or other people or vehicles. In an aspect, the cloud service 106 collects data from one or more vehicles or occupants of one or more vehicles, and creates a model of a terrain, road, route, bridge, or other travel structure. The model may then be used by other vehicles or occupants of vehicles to adjust sensor arrays on the vehicles. As an example, the cloud service 106 may receive data about a certain lane change in a road, where the road narrows and the lane change is difficult to navigate in the presence of traffic. The model may be used by vehicles that travel over the road to increase the sensitivity, resolution, processing power, or other aspect of the sensor array to better analyze the road and successfully navigate the lane change. The vehicles that later travel on the road may also upload data regarding their traversal of the road, which may be used to refine the model.

In addition, the cloud service 106 may be used as a photo or video repository by a driver of the vehicle 104. In some examples, the camera array in the vehicle 104 may be used to capture images or video and such images/video may be stored in a location at the cloud service 106 for later retrieval. As an example, the driver may view a scenic pond while driving. Using a gesture, voice command, gaze detection, or other input, the camera array may be controlled to capture an image or video of the scene and upload it to the cloud service 106. In this manner, the driver is able to capture images/videos of the surroundings with less distraction than if using a conventional hand-held camera.

The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network 108 may include a single local area network (LAN) or wide-area network (WAN), or combinations of LANs or WANs, such as the Internet. The various devices (e.g., mobile device 106 or vehicle 104) coupled to the network 108 may be coupled to the network 108 via one or more wired or wireless connections.

In operation, the vehicle 104 adaptively implements one or more sensors, or alters the operation of one or more sensors, in response to the state or location of the vehicle 104. In an example, the vehicle control system 102 is configured to detect the speed of the vehicle 104 and when the speed is faster than a threshold speed, the vehicle control system 102 modifies one or more cameras in a camera array on the vehicle 104. The modification may be to implement additional cameras in the camera array, modify the image processing of images captured by one or more cameras of the camera array, modify the focal length, zoom, or other operational aspects of one or more cameras of the camera array, or other such adjustments to provide time for sensor processing.

In another example, the vehicle control system 102 is configured to change the resolution, focal length, or zoom of one or more cameras in the camera array of the vehicle 104 based on speed. Similar to how high-beam headlights work, adjustments to cameras may be used to look farther ahead, narrow the field of view to focus on objects in the distance, or alter the resolution of the image to recognize object farther away. In an aspect, the vehicle control system 102 controls one or more cameras to zoom out farther from the vehicle 104 as the vehicle's speed increases. In another aspect, the vehicle control system 102 may control one or more cameras to increase the image resolution so that objects that are farther away have enough pixel density (e.g., dots-per-inch (DPI)) to classify and recognize objects with specificity. Low-resolution images (e.g., those with low DPI) may have large blocky pixels that do not provide enough distinct shapes to recognize letters, sign shapes, or pictographs, for example. Increasing the resolution of the image comes at a cost though—increased processing time to analyze the image. However, by reducing the amount of the image to process, such as by artificially implementing a limited field of view, the vehicle control system 102 is able to process images of objects farther away and ignore or filter objects that are nearer.

In another example the vehicle control system 102 implements multiple cameras for differing purposes. One forward-facing camera (or several cameras) is used to capture a low-resolution image. A simple classifier may be used on the low-resolution image to identify potential objects of interest. The locations of these potential objects of interest are then relayed to an image processor. The image processor may obtain a high-resolution image from another forward-facing camera or cameras. The high-resolution image may be of the object of interest (e.g., focused and zoomed toward a particular object as identified by the simple classifier) or may be of substantially the same scene (e.g., similar field of view) of the low-resolution image and cropped to isolate the object of interest. The image processor may obtain a high-resolution image of the potential object(s) of interest and use the high-resolution image in a complex classifier to determine additional information about the object. The two-tier layered approach improves sensor efficiency to accommodate faster moving vehicles.

In an embodiment, the vehicle control system 102 includes a camera array interface 110, an image processor 112, a sensor fusion module 114, and a communication module 118. The vehicle control system 102 operates as a system to manage sensors in and around the vehicle 104. The camera array interface 110 is operable to directly or indirectly control one or more cameras. The camera(s) may be activated or deactivated; directed to focus on an object or an area; controlled to zoom in or out of a scene; controlled to capture images or video for the user's later reference; or the like.

The image processor 112 is operable to implement one or more object recognition algorithms or classifiers. Various methods may be used including, but not limited to edge matching, divide-and-conquer searching, greyscale matching, gradient matching, histogram analysis, and machine learning (e.g., genetic algorithms). The image processor 112 may implement relatively simple classifiers to identify potential objects of interest in a low-resolution image. The image processor 112 may also implement relatively complex classifiers to more specifically identify an object of interest in a high-resolution image. Working together, the simple and complex classifiers provide a cascading workflow that improves processing abilities of the image processor 112. Some or all of the processing performed by the image processor 112 may be offloaded to a remote system (e.g., the cloud service). While offloading image processing to a large cloud service may decrease processing time, the communication overhead may make the entire process take longer. As such, depending on the communication abilities of the vehicle 104, offloading may not be used. For example, if the vehicle 104 is travelling in mountainous regions where a cellular signal is weak, the image processing may be performed at the vehicle 104 because the communication overhead is too great.

The sensor fusion module 114 may be used to fuse multiple inputs and manage multiple sensors. The inputs may be from the sensors in the vehicle 104 or from external sources, such as the cloud service 106. In an example, the sensor fusion module 114 obtains a model of a portion of a road and uses the model to modify operational characteristics of one or more sensors on the vehicle 104 in order to provide safer operation.

The communication module 116 is operable to communicate with at least the cloud service 106. The communication module 116 may provide communication for other components of the vehicle control system 102, such as the image processor 112 or the sensor fusion module 114. The communication module 116 may use one or multiple communication modalities including, but not limited to wireless networks (e.g., 802.11 or cellular network), ad hoc networks, personal area networks (e.g., Bluetooth), vehicle-based networks (e.g., CAN BUS), or other combinations or permutations of network protocols and network types.

The vehicle control system 102 may be disposed in the vehicle 104 or in a network server (e.g., cloud service 106). The vehicle control system 102 may be installed as an after-market component of the vehicle, or may be provided as a manufacturer option. Portions of the vehicle control system 102 may be implemented in several places, such as in a distributed computing model. For example, the imaging processing for object recognition may be provided by the cloud service 106 or another computing platform. As another example, the communication module 116 may be provided at least in part in a user device, such as a smartphone. In such an example, the vehicle 104 may communicate with the user device over a short-range telemetry (e.g., Bluetooth) and the smartphone may then communicate with the cloud service 106 over long-range telemetry (e.g., cellular).

Thus, in various embodiments, a system for managing a vehicle is illustrated in FIG. 1, the system comprising a vehicle control system 102 in a vehicle 104 to detect a speed of the vehicle 104 and adjust a forward-facing camera array based on the speed of the vehicle 104.

In an embodiment, to adjust the camera array, the vehicle control system 102 is to determine whether the speed of the vehicle violates a threshold speed, control a low-resolution camera in the camera array to capture a low-resolution image, and control a high-resolution camera in the camera array to capture an object identified in the low-resolution image. The threshold speed may be configurable by the driver or owner of the vehicle 104. Alternatively, the threshold speed may be configured by the manufacturer or provider of the camera array or the vehicle 104. In an embodiment, the threshold speed is a contact value, such as 60 miles per hour, and is based on how much time it takes to process images and recognize objects. In another embodiment, the threshold speed is a variable value and may be based on the actual performance (e.g., a moving 10 minute window) of the image processing. The variable threshold speed has an advantage of adjusting for changing conditions outside the vehicle 104, such as when there is snow, rain, fog, or other environmental conditions that may increase the processing time needed for object classification.

In an embodiment, to control the high-resolution camera comprise, the vehicle control system 102 is to identify an object of interest in the low-resolution image using a simple object classifier, determine a location of the object of interest in the low-resolution image, determine a portion of a high-resolution image captured by the high-resolution camera that corresponds to the location of the object of interest in the low-resolution image, and process the portion of the high-resolution image using a complex object classifier. Such image processing may be performed by a subsystem of the vehicle control system 102, such as the image processor 112.

In another embodiment, to control the high-resolution camera comprise, the vehicle control system 102 is to identify an object of interest in the low-resolution image using a simple object classifier, determine a location of the object of interest in the low-resolution image, control the high-resolution camera to frame the object of interest and capture a high-resolution image, and process the high-resolution image using a complex object classifier. In such an embodiment, the aim, focus, and zoom controls of the high-resolution camera may be based on a trajectory calculated using a relative angular offset of the high-resolution camera from the low-resolution camera, in addition to the relative location of the object of interest in the field of view of the low-resolution camera. Thus, in a further embodiment, to control the high-resolution camera to frame the object of interest comprise, the vehicle control system 102 is to control at least one of a zoom or a focus to frame the object of interest.

In an embodiment, to adjust the camera array comprise, the vehicle control system 102 is to adjust one of a focal length or a resolution to identify objects farther away from the vehicle when the speed of the vehicle increases. For example, by using a high-resolution image, details of objects that are farther away may be distinguishable.

In an embodiment, to adjust the camera array comprise, the vehicle control system 102 is to focus a camera in the camera array on objects farther in front of the vehicle as the speed of the vehicle increases. The camera in the camera array may consequently also have a smaller field of view. In this case, the camera may obtain higher resolution images in a smaller frame so as to not impact the overall image processing time needed to detect objects of interest in the frame.

In an embodiment, the system of FIG. 1 includes a sensor fusion module 114 to access a model of a road in a route that the vehicle is travelling, the road having a feature indicating a dangerous portion of the road, use the camera array to recognize the feature, and adjust a sensor in the vehicle when the feature is recognized. Dangerous portions of the road may be narrow lanes, dangerous objects near the road, blind intersections, or the like. When a dangerous portion of the road is ahead, the sensors may be configured to be more sensitive to provide additional safety to the occupants of the vehicle 104. In an embodiment, to adjust the sensor, the sensor fusion module 114 is to increase a resolution of a camera in the camera array. In another embodiment, to adjust the sensor comprise, the sensor fusion module 114 is to increase a sampling rate of the sensor. In a further embodiment, the sensor may be one of: a camera, a radar sensor, a LIDAR sensor, an ultrasonic sensor, or an infrared sensor.

In an embodiment, to access the model in the route, the sensor fusion module 114 is to determine a location or a route of the vehicle, transmit the location or the route of the vehicle to a cloud service (e.g., cloud service 106), and receive from the cloud service, the model of the road in the route. The location or route of the vehicle 104 may be obtained from an on-board navigation unit in the vehicle 104, which may have a pre-planned route, a current location, a destination, or other information about the vehicle's location and surroundings. The location may be obtained from a geographic location system, such as a global positioning system (GPS) or Global Navigation Satellite System (GLONASS).

In an embodiment, the model is based on a plurality of traversals over the road made by previous vehicles. For example, other vehicles equipped with similar vehicle control systems may upload features, objects, or other information from images obtained by their on-board camera arrays. Using the collective data, the cloud service 106 may generate a model for a road or a portion of a road. In an embodiment, the model is revised using a machine learning technique. Based on user feedback, for example, a back propagating machine learning technique may be used to refine the image classifiers.

In an embodiment, the system of FIG. 1 includes an image capture module to determine a gaze direction of a driver of the vehicle and process an image from a camera of the camera array based on the gaze direction. In a further embodiment, to process the image from the camera of the camera array based on the gaze direction, the image capture module is to capture the image and transmit the image to a cloud service. The image capture module may interface with the communication module 116 to transmit the image.

In an embodiment, to process the image from the camera of the camera array based on the gaze direction, the image capture module is to adjust the camera array based on the image to identify an object of interest in the image and advise the driver based on the identification of the object of interest. For example, if the driver is looking at an object that may be a pedestrian, the image capture module may adjust the camera array to capture various representations of the object (e.g., an infrared image and a visible light image) in order to determine a likely classification of the object. If there is a sufficient confidence in a classification, the image capture module may advise the driver that it is likely a person. The advice may be provided using various methods, such as a heads up display on the windshield of the vehicle 104, an audible notification, a pictographic representation on the dashboard, etc.

Figure 2:
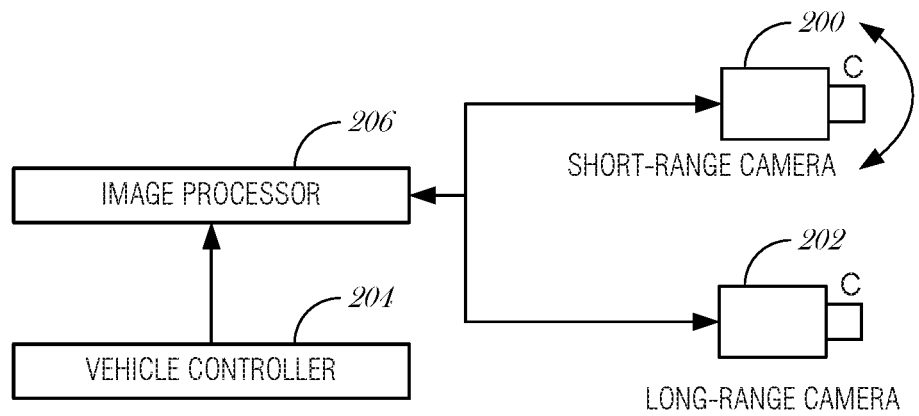
FIG. 2 is a schematic diagram of an image processing configuration, according to an embodiment.

FIG. 2 is a schematic diagram of an image processing configuration, according to an embodiment. FIG. 2 includes a short-range camera 200, a long-range camera 202, a vehicle controller 204, and an image processor 206. Based on vehicle speed detected by the vehicle controller 204 and driver's gaze direction and focus, the short-range camera 200 may be aimed in the direction of the scene and take a high-definition photo. The photo may then be uploaded to the cloud for the user to later access them, for example, to copy them to personal folders or discard them. The arrangement of cameras 200, 202 and the vehicle controller 204 as depicted in FIG. 2 may also be used for the tiered image processing discussed above.

Figure 3:
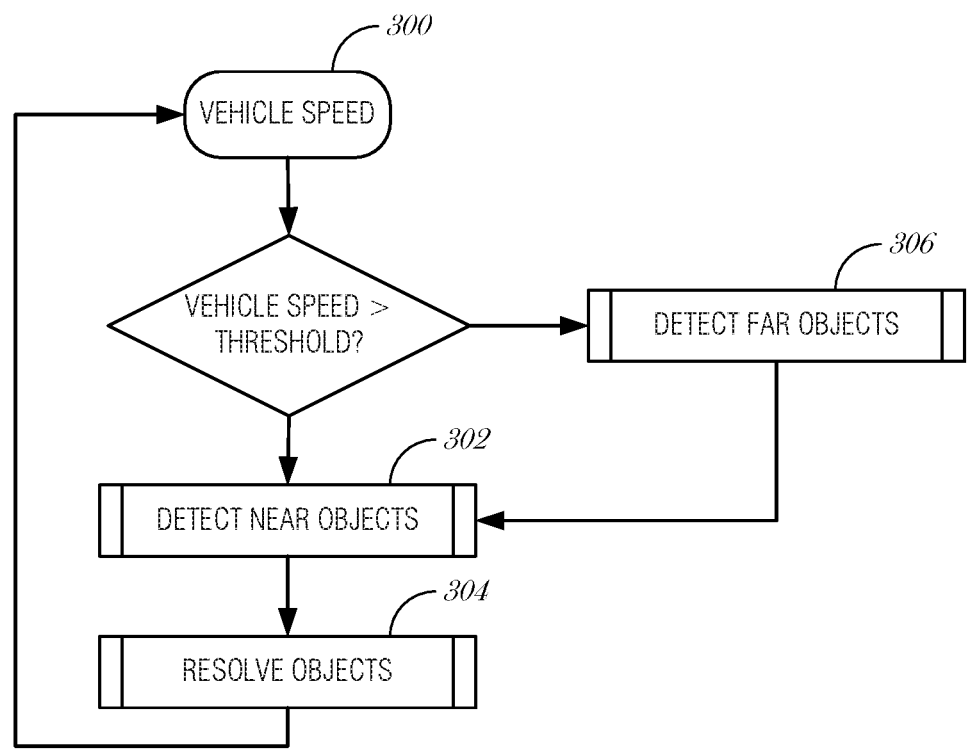
FIG. 3 is a data and control flow diagram illustrating a process to manage a camera array based on vehicle speed, according to an embodiment.

FIG. 3 is a data and control flow diagram illustrating a process to manage a camera array based on vehicle speed, according to an embodiment. At 300, vehicle input is received (e.g., vehicle speed). The vehicle input may be received from a speedometer sensor connected to the CAN BUS. In another example, the vehicle input may be received from a positioning system, such as a GPS receiver. If the vehicle speed is less than a threshold (e.g., 65 miles per hour), then nearby potential objects are detected (operation 302), and objects are resolved from the potential objects detected (operation 304). If the vehicle speed exceeds the threshold, then far potential objects are detected (operation 306), which are then resolved in the operate 304.

Figure 4:
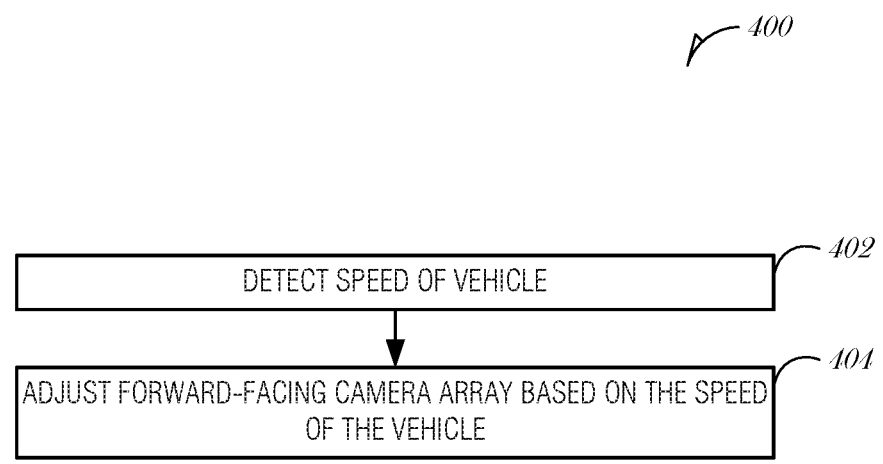
FIG. 4 is a flowchart illustrating a method of augmenting vehicle sensors, according to an embodiment.

FIG. 4 is a flowchart illustrating a method 400 of augmenting vehicle sensors, according to an embodiment. At block 402, at a vehicle control system in a vehicle, a speed of the vehicle is detected.

At block 404, a forward-facing camera array based on the speed of the vehicle is adjusted by the vehicle control system.

In an embodiment, adjusting the camera array comprises determining whether the speed of the vehicle violates a threshold speed, controlling a low-resolution camera in the camera array to capture a low-resolution image, and controlling a high-resolution camera in the camera array to capture an object identified in the low-resolution image. In a further embodiment, controlling the high-resolution camera comprises identifying an object of interest in the low-resolution image using a simple object classifier, determining a location of the object of interest in the low-resolution image, determining a portion of a high-resolution image captured by the high-resolution camera that corresponds to the location of the object of interest in the low-resolution image, and processing the portion of the high-resolution image using a complex object classifier. In another embodiment, controlling the high-resolution camera comprises identifying an object of interest in the low-resolution image using a simple object classifier, determining a location of the object of interest in the low-resolution image, controlling the high-resolution camera to frame the object of interest and capture a high-resolution image, and processing the high-resolution image using a complex object classifier. In a further embodiment, controlling the high-resolution camera to frame the object of interest comprises controlling at least one of a zoom or a focus to frame the object of interest.

In an embodiment, adjusting the camera array comprises adjusting one of a focal length or a resolution to identify objects farther away from the vehicle when the speed of the vehicle increases.

In an embodiment, adjusting the camera array comprises focusing a camera in the camera array on objects farther in front of the vehicle as the speed of the vehicle increases.

In an embodiment, the method 400 includes accessing a model of a road in a route that the vehicle is travelling, the road having a feature indicating a dangerous portion of the road, using the camera array to recognize the feature, and adjusting a sensor in the vehicle when the feature is recognized. In a further embodiment, adjusting the sensor comprises increasing a resolution of a camera in the camera array. In another embodiment, wherein adjusting the sensor comprises increasing a sampling rate of the sensor. In embodiments, the sensor comprises one of: a camera, a radar sensor, a LIDAR sensor, an ultrasonic sensor, or an infrared sensor.

In an embodiment, accessing the model in the route comprises determining a location or a route of the vehicle, transmitting the location or the route of the vehicle to a cloud service, and receiving from the cloud service, the model of the road in the route.

In an embodiment, the model is based on a plurality of traversals over the road made by previous vehicles.

In an embodiment, the model is revised using a machine learning technique.

In an embodiment, the method 400 includes determining a gaze direction of a driver of the vehicle and processing an image from a camera of the camera array based on the gaze direction. In a further embodiment, processing the image from the camera of the camera array based on the gaze direction comprises capturing the image and transmitting the image to a cloud service.

In another embodiment, processing the image from the camera of the camera array based on the gaze direction comprises adjusting the camera array based on the image to identify an object of interest in the image and advising the driver based on the identification of the object of interest.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
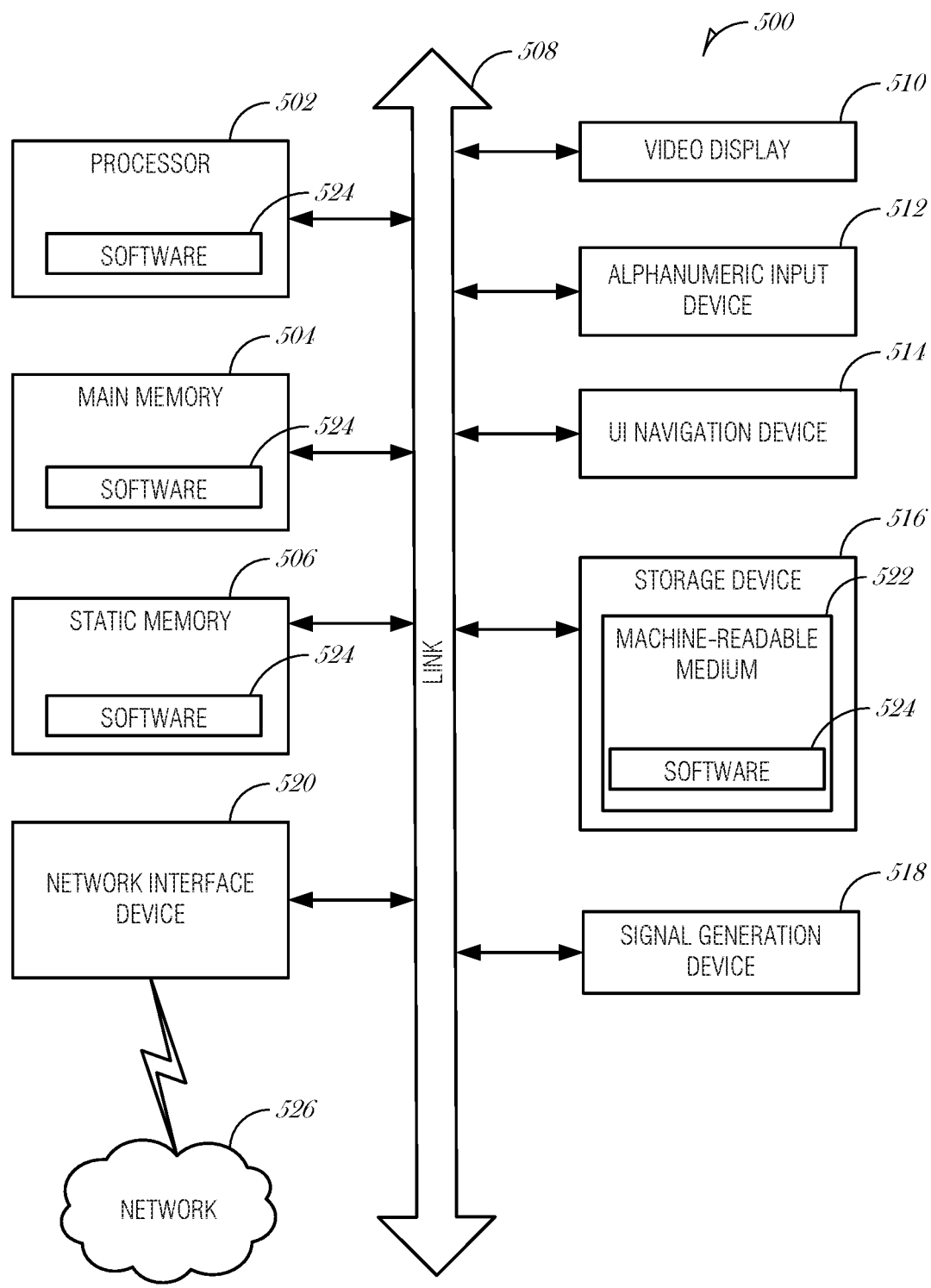
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for managing an autonomous vehicle, the system comprising: a vehicle control system in a vehicle to: detect a speed of the vehicle; and adjust a forward-facing camera array based on the speed of the vehicle.

In Example 2, the subject matter of Example 1 optionally includes, wherein to adjust the camera array, the vehicle control system is to: determine whether the speed of the vehicle violates a threshold speed; control a low-resolution camera in the camera array to capture a low-resolution image; and control a high-resolution camera in the camera array to capture an object identified in the low-resolution image.

In Example 3, the subject matter of Example 2 optionally includes, wherein to control the high-resolution camera, the vehicle control system is to: identify an object of interest in the low-resolution image using a simple object classifier; determine a location of the object of interest in the low-resolution image; determine a portion of a high-resolution image captured by the high-resolution camera that corresponds to the location of the object of interest in the low-resolution image; and process the portion of the high-resolution image using a complex object classifier.

In Example 4, the subject matter of any one or more of Examples 2-3 optionally include, wherein to control the high-resolution camera, the vehicle control system is to: identify an object of interest in the low-resolution image using a simple object classifier; determine a location of the object of interest in the low-resolution image; control the high-resolution camera to frame the object of interest and capture a high-resolution image; and process the high-resolution image using a complex object classifier.

In Example 5, the subject matter of Example 4 optionally includes, wherein to control the high-resolution camera to frame the object of interest, the vehicle control system is to: control at least one of a zoom or a focus to frame the object of interest.

In Example 6, the subject matter of any one or more of Examples 1-5 optionally include, wherein to adjust the camera array, the vehicle control system is to: adjust one of a focal length or a resolution to identify objects farther away from the vehicle when the speed of the vehicle increases.

In Example 7, the subject matter of any one or more of Examples 1-6 optionally include, wherein to adjust the camera array, the vehicle control system is to: focus a camera in the camera array on objects farther in front of the vehicle as the speed of the vehicle increases.

In Example 8, the subject matter of any one or more of Examples 1-7 optionally include, further comprising a sensor fusion module to: access a model of a road in a route that the vehicle is travelling, the road having a feature indicating a dangerous portion of the road; use the camera array to recognize the feature; and adjust a sensor in the vehicle when the feature is recognized.

In Example 9, the subject matter of Example 8 optionally includes, wherein to adjust the sensor, the sensor fusion module is to: increase a resolution of a camera in the camera array.

In Example 10, the subject matter of any one or more of Examples 8-9 optionally include, wherein to adjust the sensor, the sensor fusion module is to: increase a sampling rate of the sensor.

In Example 11, the subject matter of Example 10 optionally includes, wherein the sensor comprises one of: a camera, a radar sensor, a LIDAR sensor, an ultrasonic sensor, or an infrared sensor.

In Example 12, the subject matter of any one or more of Examples 8-11 optionally include, wherein to access the model in the route, the sensor fusion module is to: determine a location or a route of the vehicle; transmit the location or the route of the vehicle to a cloud service; and receive from the cloud service, the model of the road in the route.

In Example 13, the subject matter of any one or more of Examples 8-12 optionally include, wherein the model is based on a plurality of traversals over the road made by previous vehicles.

In Example 14, the subject matter of any one or more of Examples 8-13 optionally include, wherein the model is revised using a machine learning technique.

In Example 15, the subject matter of any one or more of Examples 1-14 optionally include, further comprising an image capture module to: determine a gaze direction of a driver of the vehicle; and process an image from a camera of the camera array based on the gaze direction.

In Example 16, the subject matter of Example 15 optionally includes, wherein to process the image from the camera of the camera array based on the gaze direction, the image capture module is to: capture the image; and transmit the image to a cloud service.

In Example 17, the subject matter of any one or more of Examples 15-16 optionally include, wherein to process the image from the camera of the camera array based on the gaze direction, the image capture module is to: adjust the camera array based on the image to identify an object of interest in the image; and advise the driver based on the identification of the object of interest.

Example 18 is a method of augmenting vehicle sensors, the method comprising: detecting at a vehicle control system in a vehicle, a speed of the vehicle; and adjusting by the vehicle control system, a forward-facing camera array based on the speed of the vehicle.

In Example 19, the subject matter of Example 18 optionally includes, wherein adjusting the camera array comprises: determining whether the speed of the vehicle violates a threshold speed; controlling a low-resolution camera in the camera array to capture a low-resolution image; and controlling a high-resolution camera in the camera array to capture an object identified in the low-resolution image.

In Example 20, the subject matter of Example 19 optionally includes, wherein controlling the high-resolution camera comprises: identifying an object of interest in the low-resolution image using a simple object classifier; determining a location of the object of interest in the low-resolution image; determining a portion of a high-resolution image captured by the high-resolution camera that corresponds to the location of the object of interest in the low-resolution image; and processing the portion of the high-resolution image using a complex object classifier.

In Example 21, the subject matter of any one or more of Examples 19-20 optionally include, wherein controlling the high-resolution camera comprises: identifying an object of interest in the low-resolution image using a simple object classifier; determining a location of the object of interest in the low-resolution image; controlling the high-resolution camera to frame the object of interest and capture a high-resolution image; and processing the high-resolution image using a complex object classifier.

In Example 22, the subject matter of Example 21 optionally includes, wherein controlling the high-resolution camera to frame the object of interest comprises: controlling at least one of a zoom or a focus to frame the object of interest.

In Example 23, the subject matter of any one or more of Examples 18-22 optionally include, wherein adjusting the camera array comprises: adjusting one of a focal length or a resolution to identify objects farther away from the vehicle when the speed of the vehicle increases.

In Example 24, the subject matter of any one or more of Examples 18-23 optionally include, wherein adjusting the camera array comprises: focusing a camera in the camera array on objects farther in front of the vehicle as the speed of the vehicle increases.

In Example 25, the subject matter of any one or more of Examples 18-24 optionally include, further comprising: accessing a model of a road in a route that the vehicle is travelling, the road having a feature indicating a dangerous portion of the road; using the camera array to recognize the feature; and adjusting a sensor in the vehicle when the feature is recognized.

In Example 26, the subject matter of Example 25 optionally includes, wherein adjusting the sensor comprises: increasing a resolution of a camera in the camera array.

In Example 27, the subject matter of any one or more of Examples 25-26 optionally include, wherein adjusting the sensor comprises: increasing a sampling rate of the sensor.

In Example 28, the subject matter of Example 27 optionally includes, wherein the sensor comprises one of: a camera, a radar sensor, a LIDAR sensor, an ultrasonic sensor, or an infrared sensor.

In Example 29, the subject matter of any one or more of Examples 25-28 optionally include, wherein accessing the model in the route comprises: determining a location or a route of the vehicle; transmitting the location or the route of the vehicle to a cloud service; and receiving from the cloud service, the model of the road in the route.

In Example 30, the subject matter of any one or more of Examples 25-29 optionally include, wherein the model is based on a plurality of traversals over the road made by previous vehicles.

In Example 31, the subject matter of any one or more of Examples 25-30 optionally include, wherein the model is revised using a machine learning technique.

In Example 32, the subject matter of any one or more of Examples 18-31 optionally include, further comprising: determining a gaze direction of a driver of the vehicle; and processing an image from a camera of the camera array based on the gaze direction.

In Example 33, the subject matter of Example 32 optionally includes, wherein processing the image from the camera of the camera array based on the gaze direction comprises: capturing the image; and transmitting the image to a cloud service.

In Example 34, the subject matter of any one or more of Examples 32-33 optionally include, wherein processing the image from the camera of the camera array based on the gaze direction comprises: adjusting the camera array based on the image to identify an object of interest in the image; and advising the driver based on the identification of the object of interest.

Example 35 is at least one machine-readable medium including instructions, which when executed by a machine, cause the machine to perform operations of any of the methods of Examples 18-34.

Example 36 is an apparatus comprising means for performing any of the methods of Examples 18-34.

Example 37 is an apparatus for augmenting vehicle sensors, the apparatus comprising: means for detecting at a vehicle control system in a vehicle, a speed of the vehicle; and means for adjusting by the vehicle control system, a forward-facing camera array based on the speed of the vehicle.

In Example 38, the subject matter of Example 37 optionally includes, wherein adjusting the camera array comprises: determining whether the speed of the vehicle violates a threshold speed; controlling a low-resolution camera in the camera array to capture a low-resolution image; and controlling a high-resolution camera in the camera array to capture an object identified in the low-resolution image.

In Example 39, the subject matter of Example 38 optionally includes, wherein the means for controlling the high-resolution camera comprise: means for identifying an object of interest in the low-resolution image using a simple object classifier; means for determining a location of the object of interest in the low-resolution image; means for determining a portion of a high-resolution image captured by the high-resolution camera that corresponds to the location of the object of interest in the low-resolution image; and means for processing the portion of the high-resolution image using a complex object classifier.

In Example 40, the subject matter of any one or more of Examples 38-39 optionally include, wherein the means for controlling the high-resolution camera comprise: means for identifying an object of interest in the low-resolution image using a simple object classifier; means for determining a location of the object of interest in the low-resolution image; means for controlling the high-resolution camera to frame the object of interest and capture a high-resolution image; and means for processing the high-resolution image using a complex object classifier.

In Example 41, the subject matter of Example 40 optionally includes, wherein the means for controlling the high-resolution camera to frame the object of interest comprise: means for controlling at least one of a zoom or a focus to frame the object of interest.

In Example 42, the subject matter of any one or more of Examples 37-41 optionally include, wherein the means for adjusting the camera array comprise: means for adjusting one of a focal length or a resolution to identify objects farther away from the vehicle when the speed of the vehicle increases.

In Example 43, the subject matter of any one or more of Examples 37-42 optionally include, wherein the means for adjusting the camera array comprise: means for focusing a camera in the camera array on objects farther in front of the vehicle as the speed of the vehicle increases.

In Example 44, the subject matter of any one or more of Examples 37-43 optionally include, further comprising: means for accessing a model of a road in a route that the vehicle is travelling, the road having a feature indicating a dangerous portion of the road; means for using the camera array to recognize the feature; and means for adjusting a sensor in the vehicle when the feature is recognized.

In Example 45, the subject matter of Example 44 optionally includes, wherein the means for adjusting the sensor comprise: means for increasing a resolution of a camera in the camera array.

In Example 46, the subject matter of any one or more of Examples 44-45 optionally include, wherein the means for adjusting the sensor comprise: means for increasing a sampling rate of the sensor.

In Example 47, the subject matter of Example 46 optionally includes, wherein the sensor comprises one of: a camera, a radar sensor, a LIDAR sensor, an ultrasonic sensor, or an infrared sensor.

In Example 48, the subject matter of any one or more of Examples 44-47 optionally include, wherein the means for accessing the model in the route comprise: means for determining a location or a route of the vehicle; means for transmitting the location or the route of the vehicle to a cloud service; and means for receiving from the cloud service, the model of the road in the route.

In Example 49, the subject matter of any one or more of Examples 44-48 optionally include, wherein the model is based on a plurality of traversals over the road made by previous vehicles.

In Example 50, the subject matter of any one or more of Examples 44-49 optionally include, wherein the model is revised using a machine learning technique.

In Example 51, the subject matter of any one or more of Examples 37-50 optionally include, further comprising: means for determining a gaze direction of a driver of the vehicle; and means for processing an image from a camera of the camera array based on the gaze direction.

In Example 52, the subject matter of Example 51 optionally includes, wherein the means for processing the image from the camera of the camera array based on the gaze direction comprise: means for capturing the image; and means for transmitting the image to a cloud service.

In Example 53, the subject matter of any one or more of Examples 51-52 optionally include, wherein the means for processing the image from the camera of the camera array based on the gaze direction comprise: means for adjusting the camera array based on the image to identify an object of interest in the image; and means for advising the driver based on the identification of the object of interest.

Example 54 is a system for augmented vehicle sensors, the system comprising: a processor subsystem; and a memory including instructions, which when executed by the processor subsystem, cause the processor subsystem to: detect a speed of a vehicle; and adjust a forward-facing camera array based on the speed of the vehicle.

In Example 55, the subject matter of Example 54 optionally includes, wherein the instructions to adjust the camera array comprise instructions to: determine whether the speed of the vehicle violates a threshold speed; control a low-resolution camera in the camera array to capture a low-resolution image; and control a high-resolution camera in the camera array to capture an object identified in the low-resolution image.

In Example 56, the subject matter of Example 55 optionally includes, wherein the instructions to control the high-resolution camera comprise instructions to: identify an object of interest in the low-resolution image using a simple object classifier; determine a location of the object of interest in the low-resolution image; determine a portion of a high-resolution image captured by the high-resolution camera that corresponds to the location of the object of interest in the low-resolution image; and process the portion of the high-resolution image using a complex object classifier.

In Example 57, the subject matter of any one or more of Examples 55-56 optionally include, wherein the instructions to control the high-resolution camera comprise instructions to: identify an object of interest in the low-resolution image using a simple object classifier; determine a location of the object of interest in the low-resolution image; control the high-resolution camera to frame the object of interest and capture a high-resolution image; and process the high-resolution image using a complex object classifier.

In Example 58, the subject matter of Example 57 optionally includes, wherein the instructions to control the high-resolution camera to frame the object of interest comprise instructions to: control at least one of a zoom or a focus to frame the object of interest.

In Example 59, the subject matter of any one or more of Examples 54-58 optionally include, wherein the instructions to adjust the camera array comprise instructions to: adjust one of a focal length or a resolution to identify objects farther away from the vehicle when the speed of the vehicle increases.

In Example 60, the subject matter of any one or more of Examples 54-59 optionally include, wherein the instructions to adjust the camera array comprise instructions to: focus a camera in the camera array on objects farther in front of the vehicle as the speed of the vehicle increases.

In Example 61, the subject matter of any one or more of Examples 54-60 optionally include, further comprising instructions to: access a model of a road in a route that the vehicle is travelling, the road having a feature indicating a dangerous portion of the road; use the camera array to recognize the feature; and adjust a sensor in the vehicle when the feature is recognized.

In Example 62, the subject matter of Example 61 optionally includes, wherein to adjust the sensor comprise instructions to: increase a resolution of a camera in the camera array.

In Example 63, the subject matter of any one or more of Examples 61-62 optionally include, wherein the instructions to adjust the sensor comprise instructions to: increase a sampling rate of the sensor.

In Example 64, the subject matter of Example 63 optionally includes, wherein the sensor comprises one of: a camera, a radar sensor, a LIDAR sensor, an ultrasonic sensor, or an infrared sensor.

In Example 65, the subject matter of any one or more of Examples 61-64 optionally include, wherein the instructions to access the model in the route comprise instructions to: determine a location or a route of the vehicle; transmit the location or the route of the vehicle to a cloud service; and receive from the cloud service, the model of the road in the route.

In Example 66, the subject matter of any one or more of Examples 61-65 optionally include, wherein the model is based on a plurality of traversals over the road made by previous vehicles.

In Example 67, the subject matter of any one or more of Examples 61-66 optionally include, wherein the model is revised using a machine learning technique.

In Example 68, the subject matter of any one or more of Examples 54-67 optionally include, further comprising instructions to: determine a gaze direction of a driver of the vehicle; and process an image from a camera of the camera array based on the gaze direction.

In Example 69, the subject matter of Example 68 optionally includes, wherein the instructions to process the image from the camera of the camera array based on the gaze direction comprise instructions to: capture the image; and transmit the image to a cloud service.

In Example 70, the subject matter of any one or more of Examples 68-69 optionally include, wherein the instructions to process the image from the camera of the camera array based on the gaze direction comprise instructions to: adjust the camera array based on the image to identify an object of interest in the image; and advise the driver based on the identification of the object of interest.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing an autonomous vehicle, the system comprising:
   a vehicle control system in a vehicle to:
      detect a speed of the vehicle; and
      adjust a forward-facing camera array based on the speed of the vehicle, wherein to adjust the camera array, the vehicle control system is to:
         determine whether the speed of the vehicle violates a threshold speed:
         control a low-resolution camera in the camera array to capture a low-resolution image; and
         control a high-resolution camera in the camera array to capture an object identified in the low-resolution image.

2. The system of claim 1, wherein to control the high-resolution camera, the vehicle control system is to:
   identify an object of interest in the low-resolution image using a simple object classifier,
   determine a location of the object of interest in the low-resolution image;
   determine a portion of a high-resolution image captured by the high-resolution camera that corresponds to the location of the object of interest in the low-resolution image; and
   process the portion of the high-resolution image using a complex object classifier.

3. The system of claim 1, wherein to control the high-resolution camera, the vehicle control system is to:
   identify an object of interest in the low-resolution image using a simple object classifier,
   determine a location of the object of interest in the low-resolution image;
   control the high-resolution camera to frame the object of interest and capture a high-resolution image; and
   process the high-resolution image using a complex object classifier.

4. The system of claim 3, wherein to control the high-resolution camera to frame the object of interest, the vehicle control system is to:
   control at least one of a zoom or a focus to frame the object of interest.

5. A system for managing an autonomous vehicle, the system comprising:
   a vehicle control system in a vehicle to:
      detect a speed of the vehicle; and
      adjust a forward-facing camera array based on the speed of the vehicle; and
   a sensor fusion module to:
      access a model of a road in a route that the vehicle is travelling, the road having a feature indicating a dangerous portion of the road;
      use the camera array to recognize the feature; and
      adjust a sensor in the vehicle when the feature is recognized.

6. The system of claim 5, wherein to adjust the sensor, the sensor fusion module is to:
   increase a resolution of a camera in the camera array.

7. The system of claim 5, wherein to adjust the sensor, the sensor fusion module is to:
   increase a sampling rate of the sensor.

8. The system of claim 7, wherein the sensor comprises one of: a camera, a radar sensor, a LIDAR sensor, an ultrasonic sensor, or an infrared sensor.

9. The system of claim 5, wherein to access the model in the route, the sensor fusion module is to:
   determine a location or a route of the vehicle;
   transmit the location or the route of the vehicle to a cloud service; and receive from the cloud service, the model of the road in the route.

10. The system of claim 5, wherein the model is based on a plurality of traversals over the road made by previous vehicles.

11. The system of claim 5, wherein the model is revised using a machine learning technique.

12. A system for managing an autonomous vehicle, the system comprising:
a vehicle control system in a vehicle to:
detect a speed of the vehicle; and
adjust a forward-facing camera array based on the speed of the vehicle; and
an image capture module to:
determine a gaze direction of a driver of the vehicle; and
process an image from a camera of the camera array based on the gaze direction, wherein to process the image from the camera of the camera array based on the gaze direction, the image capture module is to:
capture the image; and
transmit the image to a cloud service.

13. The system of claim 12, wherein to process the image from the camera of the camera array based on the gaze direction, the image capture module is to:
adjust the camera array based on the image to identify an object of interest in the image; and
advise the driver based on the identification of the object of interest.

14. A method of augmenting vehicle sensors, the method comprising:
detecting at a vehicle control system in a vehicle, a speed of the vehicle; and
adjusting by the vehicle control system, a forward-facing camera array based on the speed of the vehicle, wherein adjusting the camera array comprises:
determining whether the speed of the vehicle violates a threshold speed;
controlling a low-resolution camera in the camera array to capture a low-resolution image; and
controlling a high-resolution camera in the camera array to capture an object identified in the low-resolution image.

15. The method of claim 14, wherein controlling the high-resolution camera comprises:
identifying an object of interest in the low-resolution image using a simple object classifier,
determining a location of the object of interest in the low-resolution image;
determining a portion of a high-resolution image captured by the high-resolution camera that corresponds to the location of the object of interest in the low-resolution image; and
processing the portion of the high-resolution image using a complex object classifier.

16. The method of claim 14, wherein controlling the high-resolution camera comprises:
identifying an object of interest in the low-resolution image using a simple object classifier,
determining a location of the object of interest in the low-resolution image;
controlling the high-resolution camera to frame the object of interest and capture a high-resolution image; and
processing the high-resolution image using a complex object classifier.

17. The method of claim 16, wherein controlling the high-resolution camera to frame the object of interest comprises:
controlling at least one of a zoom or a focus to frame the object of interest.

18. The method of claim 14, wherein adjusting the camera array comprises:
adjusting one of a focal length or a resolution to identify objects farther away from the vehicle when the speed of the vehicle increases.

19. At least one non-transitory machine-readable medium including instructions, which when executed by a machine, cause the machine to:
detect at a vehicle control system in a vehicle, a speed of the vehicle; and
adjust by the vehicle control system, a forward-facing camera array based on the speed of the vehicle, wherein the instructions to adjust the camera array comprise instructions to:
determine whether the speed of the vehicle violates a threshold speed;
control a low-resolution camera in the camera array to capture a low-resolution image; and
control a high-resolution camera in the camera array to capture an object identified in the low-resolution image.

20. The at least one machine-readable medium of claim 19, wherein the instructions to control the high-resolution camera comprise instructions to:
identify an object of interest in the low-resolution image using a simple object classifier;
determine a location of the object of interest in the low-resolution image;
determine a portion of a high-resolution image captured by the high-resolution camera that corresponds to the location of the object of interest in the low-resolution image; and
process the portion of the high-resolution image using a complex object classifier.

* * * * *

UNITED STATES PATENT AND TRADEMARK OFFICE
CERTIFICATE OF CORRECTION

PATENT NO. : 9,889,859 B2
APPLICATION NO. : 14/976665
DATED : February 13, 2018
INVENTOR(S) : Tatourian et al.

Page 1 of 1

It is certified that error appears in the above-identified patent and that said Letters Patent is hereby corrected as shown below:

In the Claims

In Column 18, Line 7, in Claim 1, delete "speed:" and insert --speed;-- therefor In Column 18, Line 16, in Claim 2, delete "classifier," and insert --classifier;-- therefor In Column 18, Line 29, in Claim 3, delete "classifier," and insert --classifier;-- therefor In Column 19, Line 47, in Claim 15, delete "classifier," and insert --classifier;-- therefor In Column 20, Line 6, in Claim 16, delete "classifier," and insert --classifier;-- therefor Signed and Sealed this
Fourth Day of June, 2019

Andrei Iancu
*Director of the United States Patent and Trademark Office*